United States Patent
Thompson

[11] Patent Number: 5,529,321
[45] Date of Patent: Jun. 25, 1996

[54] TARP HARNESS DRAFT AND EQUALIZER ASSEMBLY

[76] Inventor: George R. Thompson, HC 30 Box 82B, Caldwell, W. Va. 24925

[21] Appl. No.: 351,954

[22] Filed: Dec. 8, 1994

[51] Int. Cl.⁶ .................................. B26B 15/00
[52] U.S. Cl. ............................................ 280/19
[58] Field of Search ..................... 280/19, 405.1, 280/406.1, 416, 18, 20, 28.17

[56] References Cited

U.S. PATENT DOCUMENTS

| | | |
|---|---|---|
| 645,475 | 3/1900 | King . |
| 2,452,826 | 3/1948 | Backs ........................... 248/95 |
| 3,011,820 | 12/1961 | Freider et al. ................. 294/77 |
| 3,312,263 | 4/1967 | Wahlstrom ...................... 150/2 |
| 3,771,808 | 11/1973 | Puerst ............................ 280/19 |
| 4,434,829 | 3/1984 | Barnard .......................... 150/49 |
| 4,548,372 | 10/1985 | Lutzker .......................... 248/99 |
| 4,602,664 | 7/1986 | Hullen ........................... 150/52 |
| 5,011,103 | 4/1991 | Hayes et al. ................... 248/99 |
| 5,104,133 | 4/1992 | Reiner ............................ 280/19 |
| 5,183,339 | 2/1993 | Williams ........................ 383/33 |

*Primary Examiner*—Richard M. Camby
*Attorney, Agent, or Firm*—J. Gibson Semmes

[57] ABSTRACT

A portable ground engaging, draft and equalizer assembly and kit for loading and subsequent hauling of discrete items of large bulk such as mulch, leaves, and grass cuttings. The kit is characterized by a singletree draft bar to which a hauling harness is secured, the draft bar and harness bearing clevis clips for attachment to a flexible, reinforced tarpaulin. Grommets suitably anchored in the tarpaulin selvedge edges provide towable connection thereto. Specific reinforcement of the tarp ensures against tearing under excess load conditions and the tarp is thus provided with consistently spreadable characteristics. The coaction of tow bar, tarpaulin weights in the combination, enhance the continual spreading of the tarpaulin when it is loaded and being towed by hand or tractor. The assemblage provides a readily furled travel kit, the tow bar serving as a rigid core therefor.

6 Claims, 2 Drawing Sheets

5,529,321

TARP HARNESS DRAFT AND EQUALIZER ASSEMBLY

BACKGROUND OF THE INVENTION

The invention relates to the loading and transporting of gardening and landscape refuse by means of a hauling tarpaulin which is especially suitable for items of large bulk, including discrete twigs, leaves, grass and weed cuttings, brush and the like. The assembly kit is moreover useful as a carrier of lightweight packaged granular materials and as a carrier for loads of discrete particles such as mulch. A tow bar, when harness fitted, serves not only as an anchor to keep the attached tarpaulin flat and equalized during loading, but also as an attachment device for tractor or manual transport. Its combined assembly provides a tarp-harness which is suitable for carrying large loads with minimal loss, while dragging the tarp over flat or undulating terrain, paths and/or secondary roadways. Inherent in utilizing the assembly is its versatility and its ease of handling. The bar-tarp combination is so light and maneuverable that it may be pulled by hand from one pile of brush or leaves to another during spring cleanup. When appropriately fitted with a tow bar, the flaccid tarpaulin is self-spreading in its function, during hauling. Likewise, when fully loaded, the user may simply shift the loaded tarp to a lawn tractor. The bar-tarp assembly is also suitable for loading by leaf blowers, as will be apparent from the ensuing description.

This kit essentially comprises a non-enclosing towed "vehicle" or a bag which is specifically designed to render its loading more easy and to permit hauling much larger loads than would otherwise be permissible. The flexible tarpaulin and its associated harness is sufficiently large, relative to the handler or the towing device that unusually volumous quantities of refuse may be loaded. The characteristics of discrete refuse elements such as lawn cuttings, brush or leaves cause an interlocking as between the various towed elements comprising the refuse, such that vibration of the tarpaulin during hauling will not dislodge the haulage from the tarpaulin. Unloading is undertaken by pulling one edge of the loaded tarpaulin over the loaded section, whereupon a portion of the tarpaulin may be flipped over completely and the load discharged, accordingly.

A tarp-harness of the tarpaulin is ideally suited for pulling behind a lawn tractor/mower; the limit thereof being the strength of the tarp and grommets which interconnect the tarp to the flexible harness, per se. Thus large loads of wet leaves and/or heavy brush may be easily loaded and moved by tractor and, optionally under manual hauling, a gardener can grab the bar and haul with no need to pull the tarp itself. The tarp bar thus serves as a load equalizer. One of the unique features lies in the ability to spread the tarp herein on the one side and to pull by hand on the other, all as will appear hereinafter. Key to the features of invention include lightweight, ability to spread and anchor a readily available large tarpaulin for ease of loading; its suitability for leaves, wet or dry and brush; a large capacity for towing either by hand or mechanical towing equipment; adjustable nature of the tarpaulin clips for use with different size tarpaulins and ease of assembly and use. Additionally, the tow bar acts as an excellent core around which the tarpaulin may be furled and rolled for storage and/or transport, when not in use.

| INVENTOR | DATE | PATENT NO. | TITLE |
| --- | --- | --- | --- |
| King | 1900 | 645,475 | Combined Singletree and Spreader |
| Backs | 1948 | 2,452,826 | Sack Holder |
| Frieder et al | 1961 | 3,011,820 | Webbing Cargo Net |
| Wahlstrom | 1967 | 3,312,263 | Tote Bag for Fallen Leaves |
| Barnard | 1984 | 4,434,829 | Collapsible Yard Can |
| Lutzker | 1985 | 4,548,372 | Lawn and Leaf Bag Holder |
| Hullen | 1986 | 4,602,664 | Method and Apparatus For Collecting Lawn Debris |
| Hayes et al | 1991 | 5,011,103 | Leaf Bag and Collapsible Frame |
| Williams | 1993 | 5,183,339 | Bag and Adjustable Bag Opener |

Hullen '664 comprises a bar connected to a tarpaulin for collective placement around a tree to make hand or machine hauling easier. Nevertheless, it does require anticipating where the leaves may likely fall. In contrast, no staking or anchoring of the hauling tarp is required in the present invention. Hayes '103 as Hullen aforesaid, comprises a collapsible enclosing device, forming a leaf bag and collapsible frame. It has a lesser capacity than the present invention and is not suitable to attachment to a pulling device, without substantial modification. The Williams '339 device, as Hayes, requires holding by hand while loading; moreover, no provision is made for subsequent hand draft. King's '475 combined singletree and spreader is complex, requiring two portions pivoting on a third and it is ill-adapted to draft when loaded. Backs '826 is distinguishable on the basis that it comprises a sack holder, per se. Frieder et al '820 is ill-adapted to the alternate transport of solid or packaged granular materials. The present kit is adapted to spreading on one side and pulling by hand on the other. Wahlstrom '263 requires manipulation in loading and unloading. Washington '701 again is a sack bag holder, requiring a grasping hand on the device while filling plus repeated attachment and disengagement of the spreader device from the bags as they are filled. Lutzker '372 is not adapted as a device to facilitate loading larger quantities of debris and for ease of removal thereof to the dumping site.

DESCRIPTION OF PREFERRED EMBODIMENTS

Figure 1:
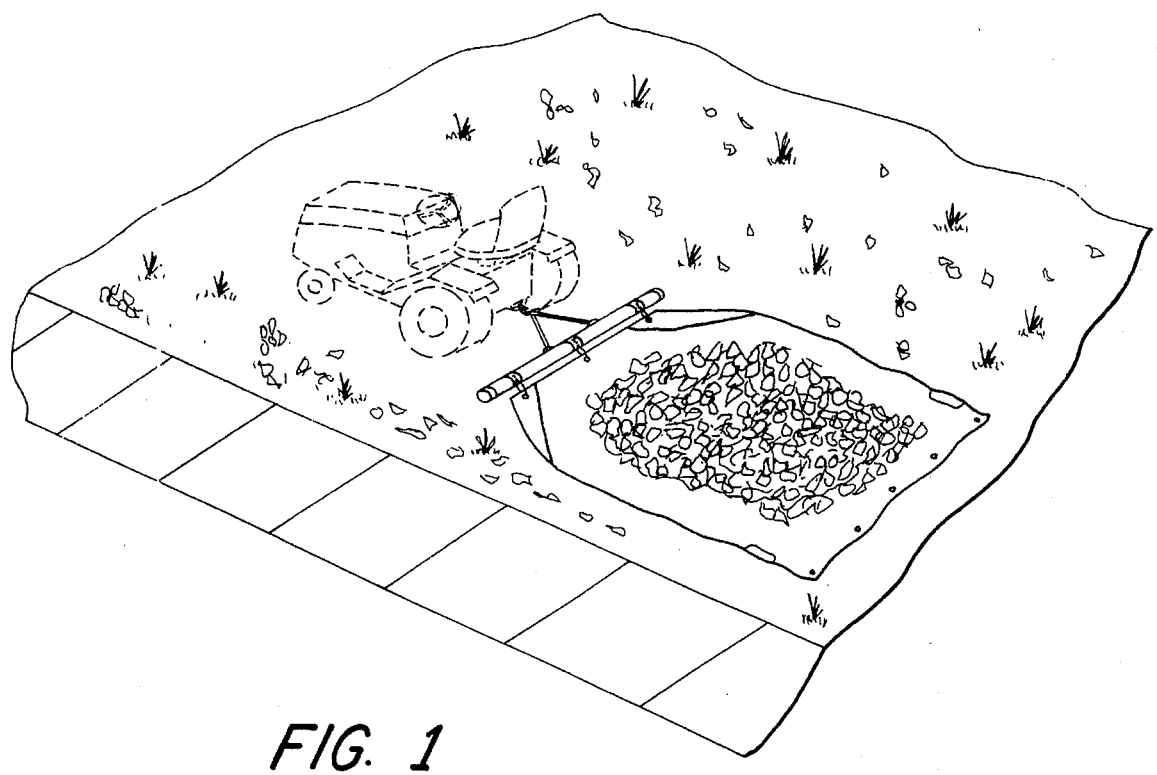
FIG. 1 is a view in perspective, showing the tarp-bar invention, partially loaded, forward folds of the tarp overlapping the main body thereof.

Referring to the drawings, it will be noted that the kit of the ground engaging draft and equalizer assembly comprises in connected array, the draft bar unit 10, the high-tension harness 20 and the rectangular tarpaulin 30. See FIGS. 1, 2 and 3.

The draft bar unit 10 includes the singletree bar 12, preferably consisting of a hollow, lightweight fiber of fiberglass tube, terminated on its ends by friction-fitting plugs 14. The draft bar itself is provided with three or more clevis clips 16, each being arranged in adjustable spaced relation, along the tubular length of the bar 12 by means of compression tube anchors 16'. The bar tube 12 is likewise bored transversely as at 18, such that appropriate eyebolts 18' may be passed through the aperture and secured, whereby the eyes of respective bolts protrude frontally of the draft bar, itself. See FIG. 3. Preferably, the eyebolts 18' each comprise: nut, washer and lock-washer for facile assembly and/or disassembly from draft bar 12. When hitched by harness to the tarp, the bar 12 serves as the draft equalizer for the assembly.

Secured to the respective tube eyebolts 18' is a high-tensile strength draft harness 20, the same having loop connection 22 with the installed eyebolts 18' of the harness 20. Intermediate the ends of the harness is the third loop 24, engaging at the forward center of its draft rope, a corresponding anchor portion of the heavy duty clevis clip 26. Loop 24 is turned upon itself to secure clip 26 against drifting along the harness 20.

An appropriate flexible tarpaulin 30 is provided at its forward end with plural, spaced apart grommets 32 which are secured in a forward selvege edge of the tarpaulin, the centermost grommet 34 being set in a reinforced, double layer patch 34' and the outermost grommets 32 each securing in similar grommets of reinforced folds 36. An ideal material for the tarp is a reinforced plastic. At the rear end of the tarpaulin 30 are grommets 32', one each being disposed adjacent the corners of the tarpaulin. Extending on either side of the ends of the tarpaulin 30 are cylindrical lead weights 38', each said weight being retained in a reinforced pocket 38 which may be sewn within a selvedge edge of each side of the tarpaulin. These two cylindrical weights are sewn lengthwise of the tarp, adjacent back-lateral margins thereof. Encased metal pellets could also be employed as weights.

Figure 2:
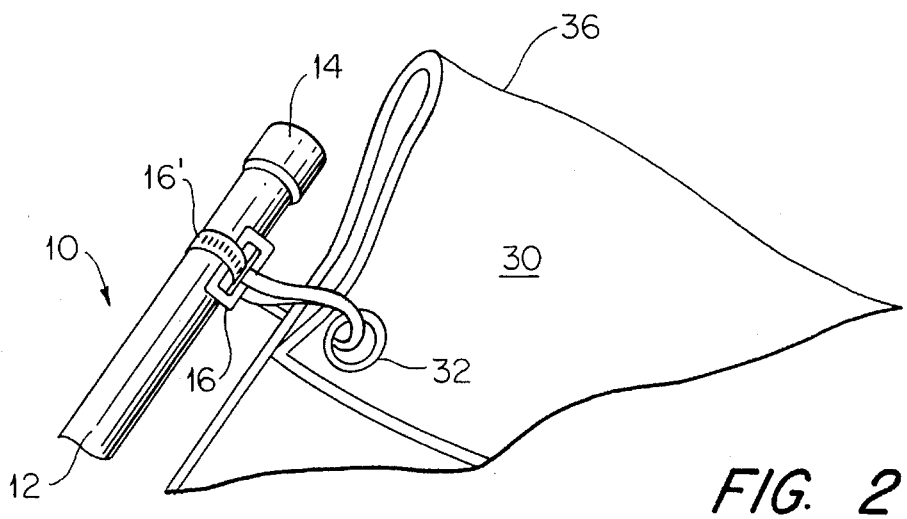
FIG. 2 is a partial view in perspective of a preferred form of folding and securing the front end of the tarp to the draft bar.

FIG. 2 represents in perspective a forward-folded portion of the invention wherein the tarp-bar combination is assembled for loading and towing. Folds 36 are derived from lateral edges of tarp 30, corresponding frontal and sidewise grommets being superimposed and aligned to be engaged by corresponding clips 16. In this arrangement, not only are the forward edges of the tarp 30 reinforced against tearing, but also a streamlined drag effect is accomplished. The complementary disposition of tarp weights 38' and equalizer harness bar 20 ensure that the spread of the tarp is maintained during hauling.

Reinforcement of the tarp in the area surrounding the center forward grommet 32 comprises a superposed layer of tarp material, forming a triangular configuration or patch 34' which is sewn over the area of penetration of the center grommet. As this grommet is retained by a double layer of material for added resistance to drag, this reinforcement overcomes the tendency for the tarp to tear when it may be overloaded, either by discrete solids or child-size passengers. A modification of invention may be provided wherein a minimum of four tow-bar clips 26 are spaced apart between ends of the tow bar. Here, lateral ends of the tarp are folded upon each other and the two outermost grommets 32 of the tarp are superimposed. The kit may thus be modified wherein four evenly spaced grommets serve an equal number of tow bar clips. In this modified kit, the draft load is most evenly distributed laterally and it thus creates a reduced draft at its forward end.

Whereas a specific rectangular configuration of the tarp is depicted, alternate geometric top plan forms may be employed herein. A characteristic assemblage includes a tow bar which is 6 feet in length, to accommodate a rectangular tarp which is 10 feet in width. Like ratios include 4': 5'; 4': 6'; 5': 8'; 6': 10'; 7': 12'. The measure of length, in any case, preferably exceeds the width.

ASSEMBLAGE

Figure 3:
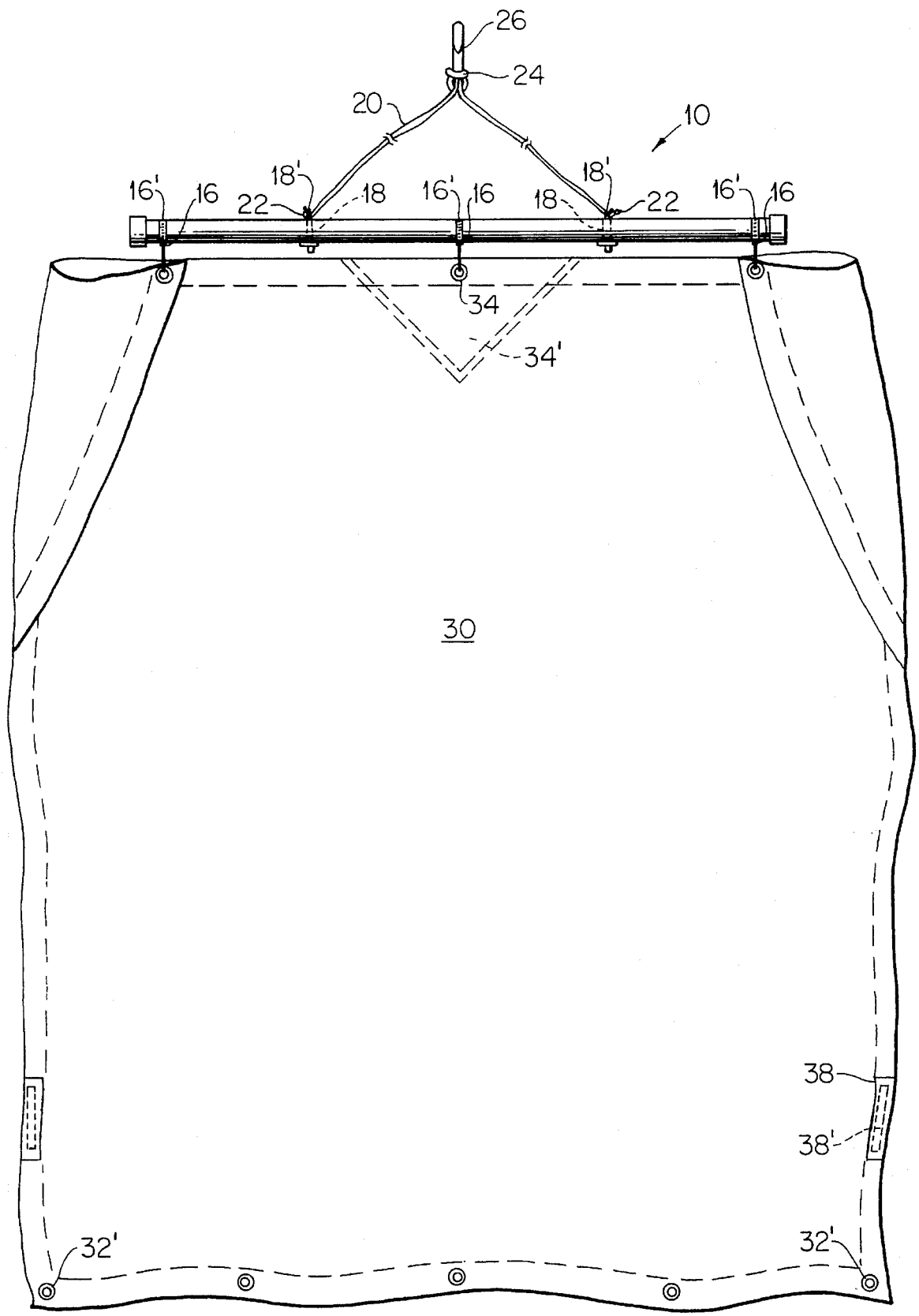
FIG. 3 is an enlarged view of the specific elements of invention, detached, reference FIG. 1, aforesaid.

By way of assembly of the FIGS. 1, 2 and 3 configuration, a rectangular tarpaulin 30 is unfolded to lay on the ground, whereupon one attaches the centermost clip 26 to the center grommet 32 on the shorter side of the tarpaulin 30. The tarpaulin is folded such that the outermost two grommets are superposed upon each other, whereupon the outer end clips 16 of the tow bar are passed through the superimposed grommets on both sides of the tarpaulin. This provides a reinforced, streamlined leading edge. Thereafter, the draw rope clevis clip 26 of the harness is secured to the harness draw rope 20 and the assemblage is complete.

Having defined the invention in its preferred domestic embodiments, the invention is restricted only by the appended claims which perforce include equivalent commercial configuration, reference the aforesaid description and drawings.

I claim:

1. A ground engaging tarp-harness draft equalizer assembly (10) for loading and hauling of discrete particles of mulch, grass and leaves comprising:

a) a rigid draft bar unit (12), said rigid draft bar unit (12) bearing spaced-apart, laterally shiftable clevis clips (16), intermediate the ends of the rigid draft bar unit (12), the clevis clips being removably engageable with a flexible tarpaulin (30);

b) a high-tension flexible draw harness (20) balanceably secured at a rear end of the flexible tarpaulin (30) to the rigid draft bar unit (12) at equidistantly spacecd-apart points along the rigid draft bar unit (12), said high-tension flexible draw harness (20) engaging at a forward end draft clevis clip (26);

c) said flexible tarpaulin (30) with spaced-apart grommets (32) in reinforced edges of the flexible tarpaulin (30), engageable and disengageable by said laterally shiftable clevis clips (16) of the rigid draft bar unit (12), forward lateral portions of said tarpaulin being folded upon themselves on opposite sides of the tarpaulin, said lateral portions being retained by said laterally shiftable clevis clips (16) engagement of superposed grommets (32), providing reinforcement and reduced draft to a forward end of the tarpaulin;

d) at least one weight secured within respective opposite selvedge edges (38) of the tarpaulin (30) adjacent its after end.

2. The ground engaging tarp-harness draft equalizer assembly (10) of claim 1 wherein the relative length and width in feet of the bar (12) to the tarpaulin (30) are at a ratio of 4:5, the tarpaulin being longer than its is wide.

3. The ground engaging tarp-harness draft equalizer assembly (10) of claim 1 wherein the relative length and width in feet of the bar (12) to the tarpaulin (30) are at a ratio of 4:6, the tarpaulin being longer than it is wide.

4. The ground engaging tarp-harness draft equalizer assembly (10) of claim 1 wherein the relative length and width in feet of the bar (12) to the tarpaulin (30) are a ratio of 5:8, the tarpaulin being longer than it is wide.

5. The ground engaging tarpaulin harness draft equalizer assembly (10) of claim 1 wherein the relative length and width in feet of the bar (12) to the tarpaulin (30) are at a ratio of 6:10, the tarpaulin being longer than it is wide.

6. The ground engaging tarp-harness draft equalizer assembly (10) of claim 1 wherein the relative length and width in feet of the bar (12) to the tarpaulin (30) are at a ratio of 7:12, the tarpaulin being longer than it is wide.

* * * * *